Sept. 6, 1932.  R. J. WRIGHT  1,875,971

CHRISTMAS DECORATION

Filed Jan. 27, 1931

INVENTOR,
Royal J. Wright,
BY
Harry W. Bowen.
ATTORNEY.

Patented Sept. 6, 1932

1,875,971

UNITED STATES PATENT OFFICE

ROYAL J. WRIGHT, OF SPRINGFIELD, MASSACHUSETTS, ASSIGNOR TO WRIGHT-LA MONTAGNE COMPANY, OF SPRINGFIELD, MASSACHUSETTS, A CORPORATION OF MASSACHUSETTS

CHRISTMAS DECORATION

Application filed January 27, 1931. Serial No. 511,526.

My invention relates to improvements in Christmas decorations, and more particularly to that type of decoration intended to simulate the usual Christmas tree of different woods as spruce, balsam, or hemlock.

An object of my invention is to provide a substitute for the usual evergreen tree used during the Christmas season for decorative purposes. The use of natural trees for this purpose is unsuitable in some conditions when a fire hazard would arise, as in residential communities. The removal of young evergreen trees results in an unnecessary drain on our natural resources. The object of my invention is to overcome these and other objections.

Broadly, my invention comprises a Christmas tree decoration formed from a single piece of sheet metal and having the general shape and appearance of what is known as a "Christmas tree."

This metal tree is formed with a central trunk portion and integral strips of metal simulating the branches or limbs extending therefrom, and means on a plurality of the branches for supporting the usual electric light bulbs or sets and other ornaments, if desired.

The evergreen trees ordinarily used are extremely inflammable after being set up in a heated room for a few days. Furthermore, as soon as the ordinary evergreen is exposed to the warmth of a house, the needles begin to fall off, creating an untidy appearance and adding naturally to the work involved in the removal of the same. After the usefulness of the tree has terminated, it must be destroyed. By substituting a metal tree for the wood, the fire hazard is eliminated, and no preparation or after cleaning up is required. The tree may, of course, be used repeatedly; in fact, it may be trimmed once and put away undisturbed until occasion arises for its use again, thus saving on the labor of decorating.

Other objects and advantages of my invention will appear in the following specification with reference to the drawing and appended claims.

A preferred form of my invention is illustrated in the accompanying drawing, in which.

Figure 1:
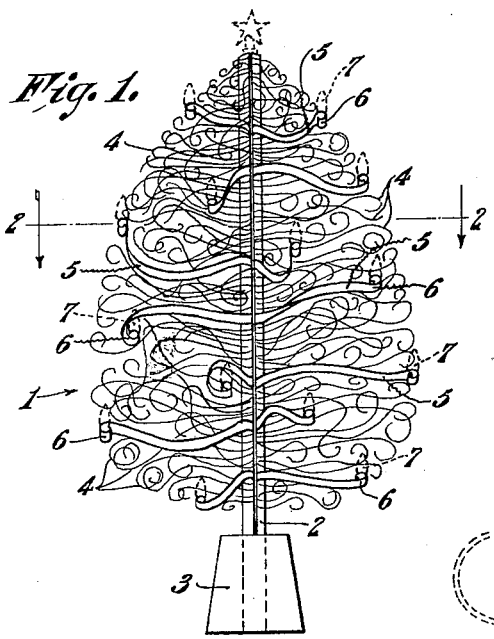
Fig. 1 is an elevational view of the tree illustrating the method of supporting the electric lights and other ornaments.
Figure 2:
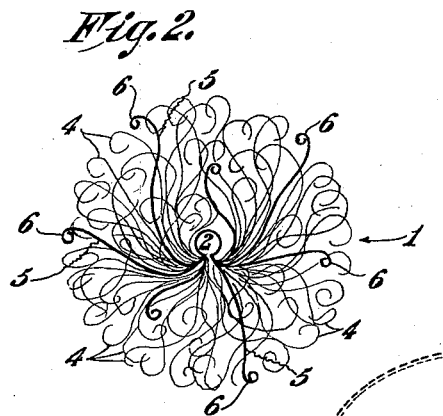
Fig. 2 is a sectional plan view on the line 2—2 of Fig. 1.

Referring now to the drawing in detail:

The tree 1 is formed with an integral central trunk portion 2 which, in practice, is secured in a supporting base 3 of wood, cement, or other suitable material, a plurality of small branches 4, and a plurality of spaced, comparatively wider branches or portions 5. The branches 5 are formed with the sockets 6 at their outer ends, for the purpose of supporting electric lights or bulbs 7.

Figures 3, 4:
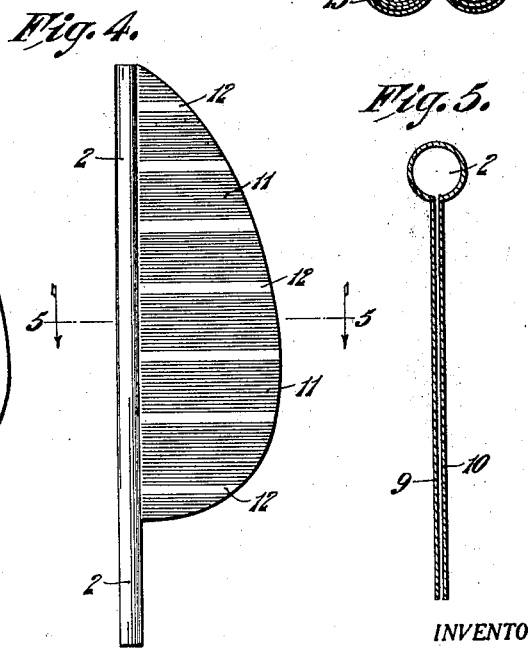
Fig. 3 is an elevational view of the metal blank from which the tree is formed.
Fig. 4 is a view of the folded blank indicating the method of forming the branches.
Figure 5:
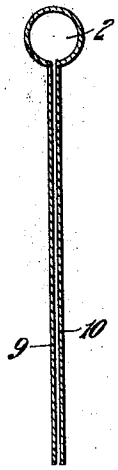
Fig. 5 is a sectional view on the line 5—5 of Fig. 4.

The method or steps employed in the formation of the tree from the metal blank is as follows; a flat sheet of metal 8, of tin or other material, as aluminum is cut approximately in the shape indicated in Fig. 3. This blank is folded on its center line around a rod or similar form, until it assumes the form or shape shown in Fig. 4, with one-half 9 of the sheet superimposed on the other half 10, as indicated in Fig. 5.

Figure 6:
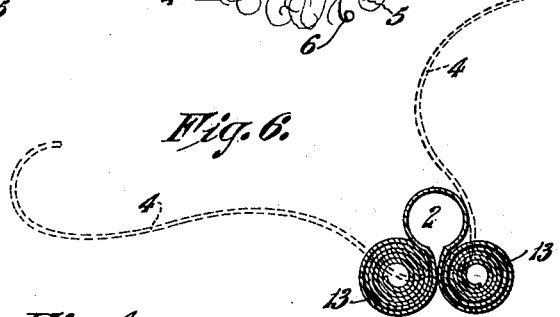
Fig. 6 is a detail view showing the spirals or curls formed when the strips are being cut in the blank, and indicated by dotted lines how these spirals are pulled out to form the branches.

The portions 9 and 10 are now sheared, or shredded, into the narrow strips 11, with occasionally wider strips 12. The strips 11, when being cut with shears, curl into tight spirals, 13, as shown in Fig. 6, and when these spirals are pulled out and bent into the desired position relative to the trunk 2, a natural wavy effect, caused by the spiral curl, is retained, thus presenting a very pleasing effect. The strips 12, being wider, and therefore stiffer, do not curl into tight spirals, and may be straightened or bent, as desired, into different positions. The branches of varied thickness, and therefore of stiffness, are adapted to support ornaments of varying weights, the lighter ornaments being placed on the thinner branches 4.

What I claim is:

1. A metal Christmas tree comprising a folded tubular trunk portion, a plurality of curling branches integral with the trunk portion and of variable widths and length, said branches retaining a part of the natural curl which is derived from their formation, said trunk and said branches being permanently formed from a single piece of sheet metal, substantially, as described.

2. The method of forming a metal Christmas tree comprising, first, the cutting of a blank of the desired shape from a sheet of thin metal which indicates the outlines of a tree, second, folding said blank about its vertical or central axial line to form the trunk portion with the two oppositely located leaves shaped approximately like one-half of a tree extending from the trunk portion and in superimposed relation to each other, third, shearing said leaves into narrow spiral strips of varying widths which are formed as the metal is sheared, fourth, pulling out and bending into the desired position the spirals caused by said shearing, and fifth, curling the ends of the heavier of said strips to form sockets for the support of electric light bulbs, candles, or other articles.

3. A metallic tree-like member comprising a tubular trunk portion having a vertical joint and integral curled branch-like portions extending outwardly from the joint in said trunk, some of the said branch portions being of greater width and formed with article receiving receptacles, as described.

4. A one-piece tree-like article composed of sheet material that is formed with a tubular trunk portion and branches integral with the trunk portion, the branches being of different widths and receptacles on the wider branches.

5. The method of forming a tree-like article from a single piece of thin sheet metal which consists in folding the blank on itself to form the trunk, then slitting the blank to form strip portions that simulate branches, then bending and pulling the slitted strips to produce the outline of a tree, as described.

6. A metal Christmas tree formed from a single flat piece of sheet metal, comprising a tubular trunk, a plurality of curled and twisted branch-like portions extending outwardly from the seam of said trunk, and article receiving pocket means formed on and integral with some of said branches for the support of electric light sockets, candles, and other ornaments.

7. As an article of manufacture, a metal tree shaped ornament formed from a single flat metal blank having a tubular trunk portion formed with a vertical slot or joint and a plurality of integral curled branches of variable widths and lengths extending outwardly from the opposite side edges of said joint.

ROYAL J. WRIGHT.